(12) United States Patent
Dong et al.

(10) Patent No.: US 6,422,754 B1
(45) Date of Patent: Jul. 23, 2002

(54) HYDRODYNAMIC SLEEVE BEARING WITH TILTING THRUST BUTTONS AND OIL DISTRIBUTION RING

(75) Inventors: Qimin J. Dong, Greer, SC (US); Anthony Uliana, Brownsburg, IN (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 70 days.

(21) Appl. No.: 09/675,864

(22) Filed: Sep. 29, 2000

(51) Int. Cl.[7] .............................................. F16C 17/06
(52) U.S. Cl. ...................... 384/122; 384/122; 384/307; 384/316; 384/321
(58) Field of Search ................................ 384/122, 307, 384/312, 316, 321

(56) References Cited

U.S. PATENT DOCUMENTS

| | | | |
|---|---|---|---|
| 3,814,487 A | * | 6/1974 | Gardner ..................... 384/307 |
| 4,525,083 A | * | 6/1985 | Pederson ..................... 384/309 |
| 5,927,860 A | * | 7/1999 | Buse ........................... 384/122 |

* cited by examiner

*Primary Examiner*—Lenard A. Footland
(74) *Attorney, Agent, or Firm*—Patrick S. Yoder; Alexander M. Gerasimow; William R. Walbrun

(57) ABSTRACT

A bearing assembly is provided which includes an annular support member and a plurality of thrust bearing elements coupled to and distributed about the face of the support member. The thrust bearing elements are adapted to receive and support an axial load of a rotating member such as a thrust collar on a shaft. An annular distribution ring is mounted to the face of the support member for restricting motion of the thrust bearing elements. A distribution passage is formed between the distribution ring and the support member in such a manner that the distribution passage carries fluid to and across each of the thrust bearing elements.

16 Claims, 4 Drawing Sheets

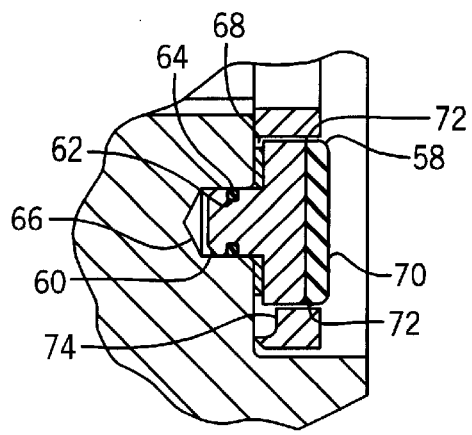
FIG. 4
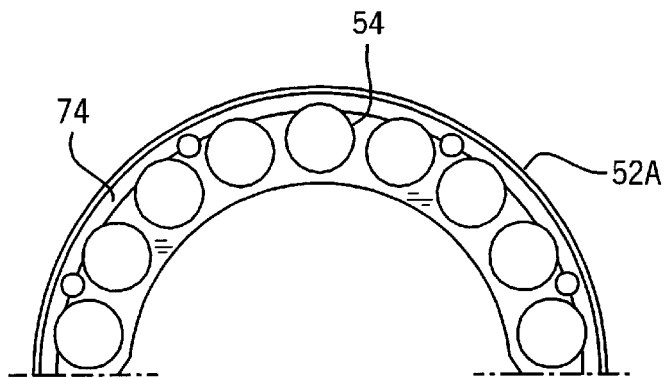
FIG. 5
FIG. 6
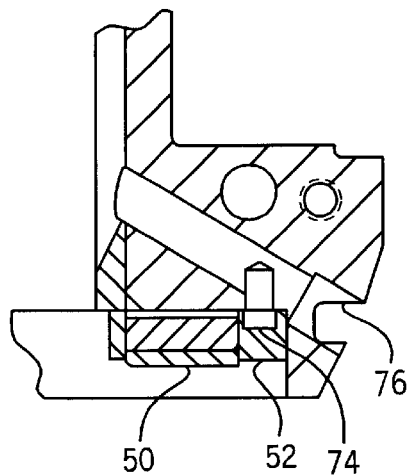

HYDRODYNAMIC SLEEVE BEARING WITH TILTING THRUST BUTTONS AND OIL DISTRIBUTION RING

BACKGROUND OF THE INVENTION

The present invention relates generally to the field of bearings. More particularly, the invention relates to hydrodynamic sleeve bearings having thrust capabilities, and even more specifically to a novel arrangement for providing lubrication and increasing the load capacity of such bearings.

A wide variety of bearings are available and are currently in use throughout a range of industrial applications. Bearings are generally used to facilitate rotational movement in a mechanical application. In general, a typical antifriction bearing includes a plurality of bearing elements between races or rings situated in a housing. Other bearings include simple journals or other bearing surfaces. Depending upon the application and the anticipated loading, various types of elements may be employed for the actual load-bearing elements. These may include journals, needles, rollers, balls, and so forth.

A journal bearing, also known as a sleeve bearing, is formed from a plain cylindrical sleeve that carries a rotating shaft. Sometimes, journal bearings are also referred to as fluid film bearings because of the presence of a thin film of lubricant formed between the cylindrical sleeve and the rotating shaft. The coefficient of friction experienced by the rotating shaft is dependent, in large part, on whether a fluid film is fully developed. In essence, a fully developed fluid film creates a hydrodynamic pressure sufficient to float the shaft and its respective load relative to the sleeve or journal. The result of a fully developed fluid film is that there is no physical contact between the rotating shaft and the journal during operation. Proper development of a fluid film is generally dependent on adequate lubrication of the bearing journal.

While bearings are often thought of in terms of restricting radial movement while allowing rotation of a shaft, bearings can also be configured to restrict the axial movement of the shaft. Such bearings are typically referred to as thrust bearings or bearings with thrust capacity. Thrust bearings typically operate at lower speeds than their non-thrust bearing counterparts. The general principle behind a thrust bearing is to provide a surface against which a shoulder or other element of a shaft or collar may bear. The simplest way to accomplish this is to form a thrust ring as an integral part of the bearing assembly. The thrust ring is often fixed in some way to the bearing housing and has an annular surface against which a shoulder or collar may bear as it rotates. In certain designs, the thrust ring is broken into sections which, when placed together, form a substantially annular surface for the shoulder or collar to bear against. Lubrication is introduced across the working face of the thrust ring to reduce associated friction. However, frictional loads tend to be relatively high in thrust bearings.

One manner of improving the frictional characteristics of a thrust bearing is to place grooves into the thrust ring surface. Lubricant is then introduced to the surface of the thrust bearing through the grooves, which allows an oil film to develop between the bearing ring and the collar of the shaft similar to that of the journal bearing. Other designs have also been employed to reduce associated friction, to increase the thrust capacity, and to increase the overall efficiencies of thrust bearings. Such designs include segments with a stepped surface, segments with a tapered surface, and segments which may tilt and self-adjust. Each design brings both advantages and complexities.

For example, a stepped bearing is a relatively simple design and relatively inexpensive to produce. The step bearing is essentially a flat bearing with a portion of the surface or a portion of the surface of each segment stepped down. The stepped down portion is not in working contact with the shoulder or collar, and thus the working surface area is reduced. This design may also aid in lubrication by creating a location from which lubricant may be introduced to the working surface. However, because step bearings are inherently sensitive to misalignment between the bearing and shaft, and because of the reduced area of the working surface, step bearings are typically used only on bearings of smaller sizes.

The tapered bearing on the other hand, may be used on larger bearings, but becomes more expensive to manufacture and still has some sensitivity to alignment. Tapered bearings are similar to step bearings, but included tapered portions rather than stepped portions. Oil grooves are often placed adjacent the tapered portion to assist with lubrication. The tapered design is more efficient than the stepped design at introducing lubrication and developing a film between the collar and working surface of the bearing.

The tilting pad bearing, sometimes referred to as a Kingsbury thrust bearing, has high thrust capabilities and the ability to absorb significant amounts of misalignment. However, the Kingsbury thrust bearing is more complex and costly to produce than the previously mentioned bearing types. The bearing members in this type are tiltable shoes (segments) which rest on hard steel buttons mounted on the bearing housing. The members can freely tilt with the steel button as a pivot point. The members tilt during rotation of the collar and help to form a wedge-shaped oil film between the shoe surface and the collar of the shaft. Again, the shape of the shoes are typically such that, when placed together, they form a substantially annular ring on which the shoulder or collar bears.

One concern with thrust bearings, regardless of the design utilized, is proper lubrication. In addition to proper fluid film development, mentioned above, adequate lubrication has other related and consequential benefits. For example, it is commonplace to equip a thrust bearing with a means for lubricating the thrust ring (or segments) during operation, to prolong the useful life of the thrust ring. This is typically accomplished by providing a synthetic or mineral lubricant, such grease or oil, to coat the surfaces of each thrust ring segment. The application of grease or oil serves to preclude the ingress of contaminants, such as dirt, debris, moisture, and so forth. Another advantage provided by proper lubrication is the cooling of the thrust components during operation. Temperature control is an important consideration in bearing design and selection. In particular, temperature control plays an important role in determining expected life of a bearing and the associated thrust components. Likewise, a thrust bearing load capacity is strongly correlated to temperature of the thrust components. Various methods are utilized to provide proper lubrication to the thrust components in an attempt to obtain these benefits. However, improved lubrication is always desirous in a thrust bearing.

There is a need, therefore, for an improved bearing which efficiently and effectively provides thrust capacity. There is also a need to provide proper lubrication with greater temperature control for such a bearing.

SUMMARY OF THE INVENTION

In accordance with one aspect of the present technique, a bearing assembly is provided which includes an annular support member and a plurality of thrust bearing elements coupled to and distributed about the face of the support member. The thrust bearing elements are adapted to receive and support an axial load of a rotating member such as a thrust collar on a shaft. An annular distribution ring is mounted to the face of the support member. A distribution passage is formed between the distribution ring and the support member in such a manner that the distribution passage carries fluid to and across each of the thrust bearing elements.

The bearing assembly may further include a feed port in communication with the distribution passage which is adapted to receive fluid from an external source. A retainer ring and feed port may be arranged such that the fluid has a first flow rate as it is introduced at the feed port and second increased flow rate as it enters the distribution passage. The feed port may further be designed to be in parallel communication with the distribution passage and a lubrication channel for a main radial bearing.

In accordance with another aspect of the technique, a distribution ring is provided to provide efficient lubrication and cooling to a plurality of thrust bearing elements. The distribution ring includes a distribution passage which is in communication with the thrust bearing elements. The ring may be designed to include various features and benefits as described with the above bearing assembly.

In accordance with yet another aspect of the technique, a method is provided for distributing fluid to a plurality of thrust members coupled to a support member in a thrust bearing. A substantially annular member has a plurality of openings for receiving the plurality of thrust members. The substantially annular member is coupled to the support member and a distribution passage is formed between the substantially annular member and the support member. A fluid is introduced through the distribution passage to, and across, each of the thrust members. The fluid is introduced from an external source through a feed port which may be in parallel communication with the distribution passage and a lubrication channel for a main radial bearing. The feed port and distribution passage may also be adapted such that the fluid has a first flow rate as it is introduced at the feed port and second increased flow rate as it enters the distribution passage.

BRIEF DESCRIPTION OF THE DRAWINGS

The foregoing and other advantages of the invention will become apparent upon reading the following detailed description and upon reference to the drawings in which:

FIG. 4 is an enlarged view of a portion of the assembly of FIG. 3;

FIG. 5 is a partial sectional view of the th rust assembly of FIG. 2;

FIG. 6 is an elevational view of a distribution ring employed according to an embodiment of the technique.

DETAILED DESCRIPTION OF SPECIFIC EMBODIMENTS

Figure 1:
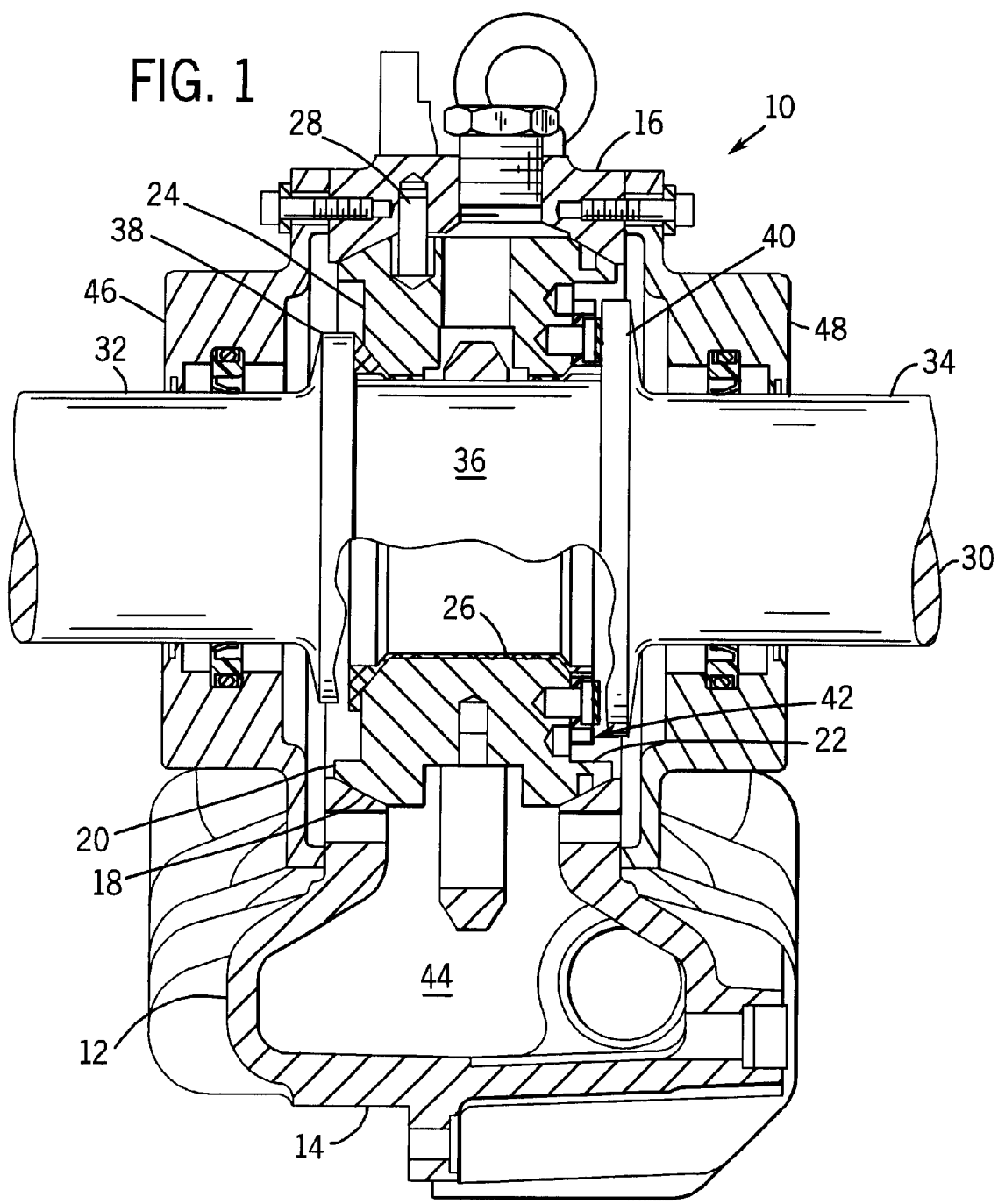
FIG. 1 is a partial sectional view of a bearing assembly according to one embodiment of the present technique.

Turning now to the drawings and referring to FIG. 1, a bearing assembly 10 is shown. The bearing assembly 10 includes a bearing housing 12 which is formed from a base 14 and a cap 16. The cap 16 is coupled to the base 14 to house various internal components. The housing 12 also includes a spherical seat support 18 adapted for receiving a bearing element 20. In a present embodiment, the bearing element is formed of a lower bearing liner 22 and an upper bearing liner 24 which are mating and cooperating components. The inner surface of the bearing liners 22 and 24 are coated with a babbitt lining 26 in a manner well known to those skilled in the art. The bearing element 20 is fixed relative to the housing 12 with an anti-rotation pin 28.

The bearing assembly 10 is depicted as a fluid film bearing, but is contemplated as being a bearing of any type which facilitates the rotating motion of a shaft. Also, while a particular style of housing is depicted, numerous bearing housing designs are within the scope of this disclosure. For example, bearings conforming to ISO standards 11687-1, 11687-2, or 11687-3 may be adapted to use with the present technique.

A shaft 30 is received by the bearing element 20 and traverses the bearing housing 12. The shaft 30 is defined, for convenience of discussion, as having an inboard side 32, an outboard side 34 and a center portion known as the journal 36. Flanking the journal 36 are a pair of thrust collars defined as the inboard thrust collar 38 and the outboard thrust collar 40. Each collar abuts a thrust assembly 42 which is integrated with either the bearing element 20 or the bearing housing 12. The thrust collars 38 and 40 work in conjunction with the thrust assembly 42 to restrict the transverse or lateral movement of the shaft 30. The thrust assembly 42 will be discussed in greater detail below. It should be noted that the same thrust bearing arrangement could be provided on either one bearing end face, or on both sides of the bearing, that is, on inboard and outboard sides.

Lubricant is provided through a feed port in the bearing housing (not shown in FIG. 1) to the bearing element. The lubricant is introduced in such a way so that it forms a thin film between the journal 36 and the babbitt lining 26. With a properly formed fluid film, the shaft 30 rotates without actually contacting the babbitt lining 26, but is supported on the film. Fresh lubricant is continually introduced to the bearing and the lubricant collects in the oil sump 44 for recirculation. Before the lubricant from the oil sump is re-introduced to the bearing element 20, it may be circulated through a heat exchanger and a filtration system.

A set of seal assemblies 46 and 48 are mounted to the bearing housing 12 to contain the lubricant within the housing 12 during operation. The seal assemblies 46 and 48 also serve to keep various contaminants from entering into the housing. While the seal assemblies 46 and 48 are shown to be similar in construction to one another, they may differ from each other in design and construction depending on the specific operating environment of the bearing as well as with other operating parameters.

Figure 2:
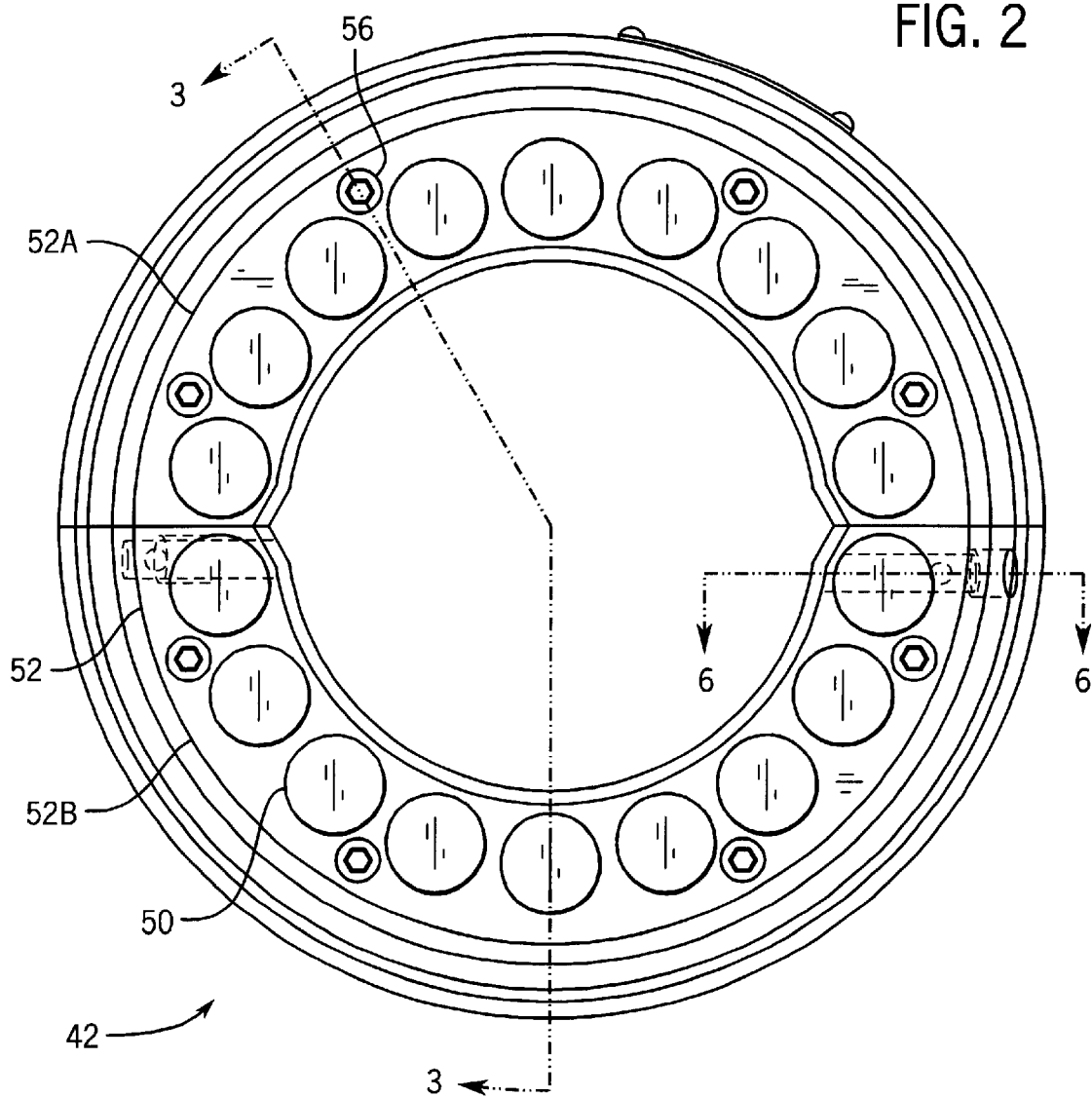
FIG. 2 is an elevational view of a thrust assembly as employed according to an embodiment of the technique.
Figure 3:
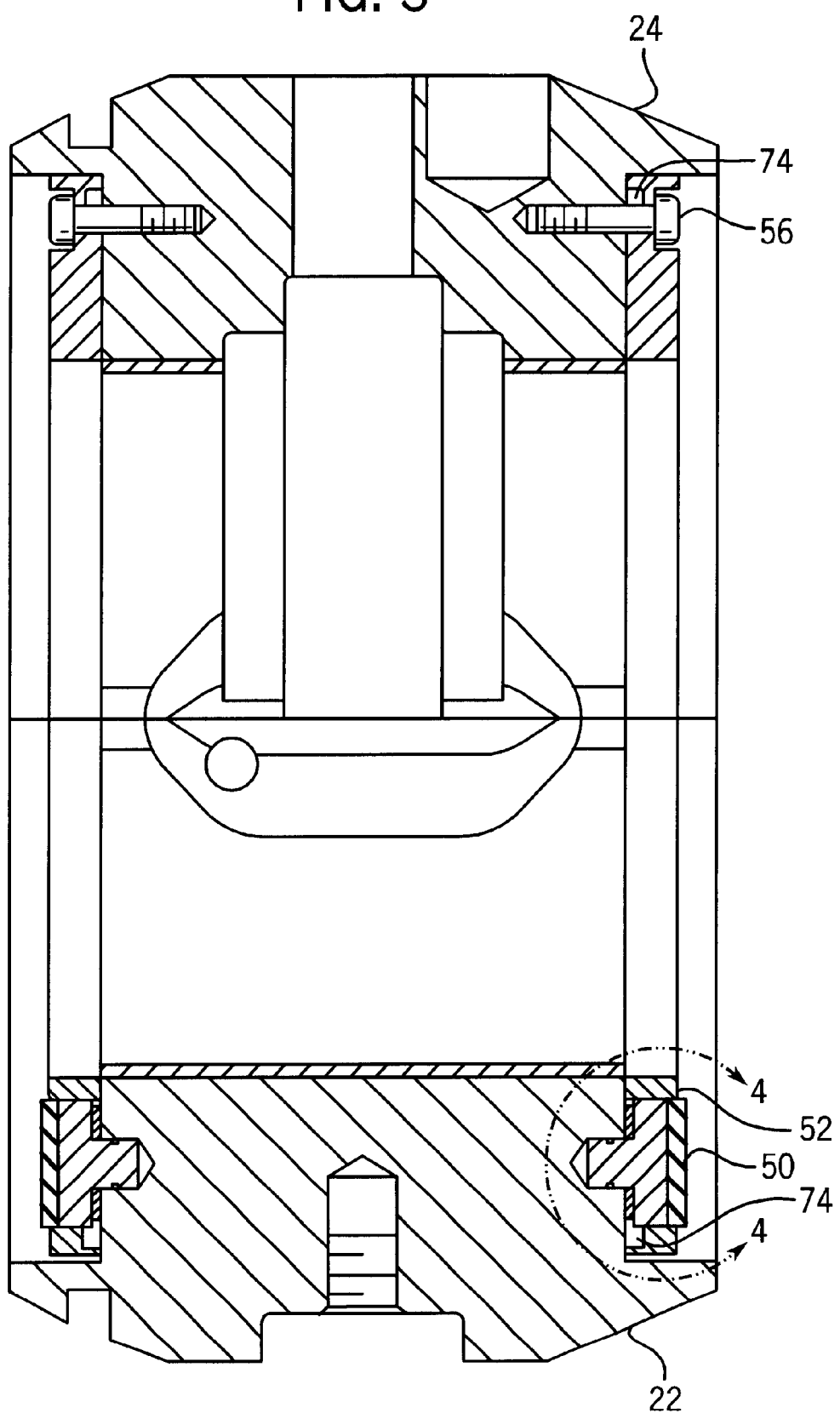
FIG. 3 is a partial sectional view of the thrust assembly of FIG. 2.

Turning now to FIGS. 2 and 3, the thrust assembly 42 will be discussed in greater detail. The thrust assembly 42 is formed of a series of thrust bearing elements, or thrust buttons 50, arranged in a circumferential pattern and coupled to a support member. In a presently preferred embodiment, the support member is the bearing element 20 which is also used to facilitate rotational motion of the shaft 30. However, the support member may be an independent element of the overall bearing assembly.

A retaining ring 52 is mounted to the face of the bearing element 20 and has a plurality of bores 54 to accommodate the passage of the thrust buttons 50 therethrough. The retaining ring 52 is affixed to the bearing element by fasteners such as setscrews 56, or the like. The retaining ring 52 serves to control the movement of the thrust buttons 50 within a predetermined range during operation of the bearing 10, and to aid in oil flow distribution. As seen in FIG. 3, the thrust buttons 50 protrude slightly past the face of the retaining ring 52. This means that the thrust collar 38 or 40 is never in contact with the retaining ring 52 and, therefore, the retaining ring 52 itself does not bear any significant load.

While in the illustrated embodiment, thrust buttons 50 are provided on one side of the bearing, such buttons and associated elements may be provided on both sides of the bearing, as well as on both sides of the retaining ring. Moreover, the form of the thrust buttons may vary, as may the manner in which the retaining ring is secured to the bearing element. Also, as mentioned below, passages in the retaining ring may be provided in one or both faces, to permit oil distribution to the thrust buttons.

In a presently preferred embodiment, the retaining ring 52 is an annular member which is split to form two separate but mating components 52A and 52B. The split ring allows the thrust assembly to be removed, such as for inspection, repair, or replacement, without requiring the removal of the shaft 30. The mating components may be made as identical elements to reduce manufacturing costs and to allow for fewer replacement parts. The retaining ring may be formed from any suitable material, such as steel, bearing alloy, or engineering plastics.

Referring to FIG. 4, the thrust buttons 50 will be described in more detail. The thrust button has a main body portion 58 connected to a stub 60. The stub 60 has a small circumferential groove 62 formed about it which accommodates a retaining spring 64. The stub 60 is placed in a corresponding bore 66 found in the bearing element 20. The retaining spring 64 presses against the periphery of the bore 66 to hold the thrust button 50 in place during assembly. A biasing member 68, such as a belleville washer, is placed between the thrust button 50 and the face of the bearing element 20. This permits slight displacement of the thrust button 50, and allows the buttons to tilt in any direction, thus allowing for some misalignment between the thrust collar 38 or 40 and the thrust buttons 50. This also aids the thrust buttons 50 in maintaining evenly distributed pressure on the thrust collar. The thrust buttons 50 are also shown to have a babbitt lining 70, such as a bearing copper alloy.

Referring now to FIGS. 3, 4 and 5, the retaining ring 52 is shown to have several openings or bores 54 as mentioned above. Each bore 54 accommodates the mounting of a thrust button 50. The bore diameters are designed to be slightly larger than the diameter of the thrust buttons 50 so that a gap 72 is formed between the two. The gap 72 also allows the thrust button 50 to move or tilt within a limited range. Moreover, the gap serves as a point of entry for lubrication to flow across the thrust button 50 as shall be discussed shortly.

A distribution passage 74 is circumferentially formed on the back surface of the retaining ring 52, that is, the surface which mates with the face of the bearing element 20. The distribution passage 74 is located so as to slightly overlap the bores 54 formed in the retaining ring. This is best seen in FIG. 5 which is an elevational view of the back side of a retaining ring half 52A. This can also be seen in FIG. 4, which shows that the distribution passage 74 and the bore 54 merge into each other and provide communication with one another. Thus, with the retaining ring halves 52A and 52B placed together as mating components, a communicative network is formed between the bores 54 and the circumferential distribution passage 74. Where desired, distribution passages may be formed in both faces of the retaining ring, such as for oil distribution to thrust buttons on both sides of the ring.

To supply lubricant to the distribution passage 74, a pair of feed ports 76 are formed in the bearing element 20 as depicted in FIG. 6, (and also shown in phantom in FIG. 2). The feed ports 76 are connected to an external lubricant source (not shown) and simultaneously, or in parallel, supply oil to the babbitted liner 26 on the bearing element 20 and to the distribution passage 74 in the thrust assembly 42. The feed ports 76 and distribution passage 74 are designed in such a manner as to create a throttling effect of the lubricant as it enters the distribution passage. Thus, the distribution passage 74 acts as a nozzle to accelerate the flow rate of the lubricant. This configuration provides several functions. First, the throttling effect helps to effectively carry the lubricant to each thrust button 50 in the thrust assembly 42. The throttling effect also serves to more efficiently transfer heat away from the thrust buttons 50.

By maintaining the thrust buttons 50 at a lower temperature, a thicker and more effective fluid film is developed between the thrust buttons and the thrust collars 38 and 40. As previously mentioned, proper fluid film development is desired to enhance performance in a thrust or journal-type bearing. Another benefit is more efficient temperature control, permitting an increase in speed and/or load as seen by the thrust assembly. For example, it has been found that by providing lubrication in the manner described above, a temperature drop of up to 40° F. can be achieved in light load applications. It has also been found that with a 10° F. drop in temperature, the load capacity increases 30 % and 25% at shaft speeds of 1800 RPM and 2500 RPM, respectively. Thus, the overall efficiency of the bearing is increased by effective lubrication and temperature control of the thrust buttons 50.

Another feature that may be added to the thrust bearing assembly is the insertion of thermocouples (not shown) at strategic locations for monitoring the temperature of the thrust buttons 50. This could be accomplished by placing thermocouples at or adjacent the thrust buttons 50, or near the stub 60. This would allow the temperature to be continually monitored, indicating whether bearing speed, load, or lubrication flow rate require adjustment. Furthermore, such monitoring could take place in a closed loop system which would automatically adjust the above mentioned parameters in accordance with the actual temperature of the thrust bearing.

Other modifications that are contemplated as being in harmony with the disclosed embodiment include choice of materials employed as well as means used for fabrication. For example the retainer ring or thrust buttons may be formed of any suitable material, such as steel, bearing copper alloy or engineering plastics. Because of the broad range of materials available, various techniques of manufacture may be utilized including machining, casting, or molding.

Another contemplated modification concerns the number and location of the feed ports 76. While two ports are shown in mirrored locations about a vertical centerline as seen in FIG. 2, other arrangements may be employed. For example, depending on the lubrication flow requirements for the bearing, the load, speed and predicted temperature, it may be advantageous to add one or more additional ports, or to arrange the ports symmetrically. Similarly, the distribution passage 74 need not be formed wholly in the retainer ring 52. Instead, it may be formed in the support member (i.e. the bearing element 20), or partially in the retainer 52 and partially in the support member.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A bearing assembly comprising:
   an annular support member;
   a plurality of thrust bearing elements coupled to and distributed about a face of the support member, the thrust bearing elements being adapted to receive and support an axial load of a rotating member;
   an annular distribution ring mounted to the face of the support member; and
   a distribution passage formed between the distribution ring and the support member, the distribution passage being adapted to carry a fluid to and across each of the thrust bearing elements.

2. The bearing assembly of claim 1, further comprising at least one feed port in communication with the distribution passage and adapted to receive fluid from an external source.

3. The bearing assembly of claim 2, wherein the fluid has a first flow rate as it is introduced at the feed port and second increased flow rate as it enters the distribution passage.

4. The bearing assembly of claim 2, further comprising a radial bearing element having a lubrication channel wherein the feed port is in communication with the lubrication channel.

5. The bearing assembly of claim 4, wherein the feed port is in parallel communication with the distribution passage and the lubrication channel.

6. The bearing assembly of claim 1, wherein the distribution passage is at least partially formed in the distribution ring.

7. The bearing assembly of claim 1, wherein the distribution passage is at least partially formed in the support member.

8. The bearing assembly of claim 1, wherein the fluid carried in the distribution passage is a lubricant.

9. The bearing assembly of claim 1, wherein the fluid carried in the distribution passage is a coolant.

10. The beating assembly of claim 1, wherein the distribution ring is also adapted to limit radial movement of the thrust bearing elements.

11. The bearing assembly of claim 10, wherein the distribution ring is split to form two mating elements.

12. The bearing assembly of claim 11, wherein the mating elements are identical to each other.

13. The bearing assembly of claim 11, wherein the mating elements are formed of an engineering plastic.

14. The bearing assembly of claim 1, wherein the thrust bearing elements are able to pivot relative to the face of the support member.

15. The bearing assembly of claim 14, further comprising a biasing member disposed between each thrust element and the face of the support member.

16. The bearing assembly of claim 15, wherein the support member is also a radial bearing element adapted to receive and facilitate the radial load of a rotating shaft.

\* \* \* \* \*